United States Patent [19]

Watanabe et al.

[11] 4,151,220

[45] Apr. 24, 1979

[54] POWDER COATING COMPOSITION

[75] Inventors: Yoshihide Watanabe; Keiji Kitada; Osamu Kuratani; Makoto Iriuchijima, all of Saitama, Japan

[73] Assignee: Maruzen Oil Co., Ltd., Osaka, Japan

[21] Appl. No.: 769,824

[22] Filed: Feb. 17, 1977

[51] Int. Cl.[2] ........................ C08L 61/24; C08L 61/28; C08L 75/06; C08L 67/02

[52] U.S. Cl. ........................................ 260/850; 528/45; 528/47; 528/309

[58] Field of Search ............... 260/850, 75 R; 528/45, 528/47, 309

[56] References Cited

U.S. PATENT DOCUMENTS

| | | | |
|---|---|---|---|
| 3,759,854 | 9/1973 | Chang et al. | 260/850 |
| 3,814,724 | 6/1974 | Suzuki et al. | 260/40 R |
| 3,928,346 | 12/1975 | Wentworth | 260/75 R |
| 3,953,403 | 4/1976 | Fujiyoshi et al. | 260/850 |
| 4,012,363 | 3/1977 | Bruning et al. | 260/75 R |

*Primary Examiner*—John C. Bleutge
*Attorney, Agent, or Firm*—Sughrue, Rothwell, Mion, Zinn and Macpeak

[57] ABSTRACT

A powder coating composition containing a vehicle which comprises about 50 to about 98% by weight of a polycondensate obtained by a polycondensation of a polyol component comprising at least about 30 mol% 2-methylbutane-1,3-diol and a polycarboxylic acid component comprising at least about 50 mol% terephthalic acid and/or dimethyl terephthalate and about 2 to about 50% by weight of a crosslinking agent. The powder coating composition has a good storage stability (or powder stability) and also the boiling water resistance, the smoothness, the gloss, the flexibility, the adhesiveness, etc., in particular of a film thereof is quite excellent.

24 Claims, No Drawings

POWDER COATING COMPOSITION

BACKGROUND OF THE INVENTION

1. Field of the Invention

The present invention relates to a thermosetting polyester-type powder coating composition containing, as a vehicle a poly-condensate obtained from 2-methylbutane-1,3-diol (isopentyl glycol) (hereinafter referred to as "IPG", for simplicity) and terephthalic acid (hereinafter referred to as "TA", for simplicity) or dimethyl terephthalate (hereinafter referred to "DMT", for simplicity) as an essential ingredient.

2. The Description of the Prior Art

Recently, a powder coating which does not contain an organic solvent which causes air pollution, has been strongly desired from a social standpoint, and such a coating which does not use an organic solvent has been seriously considered. Various materials such as an acrylic resin, an epoxy resin or the like have been proposed as a vehicle of a powder coating. However, disadvantages exist because an acrylic resin type powder coating is expensive and has poor chemical resistance. Further the inherently bad smell of the acrylic acid is generated on curing. An epoxy resin type powder coating has poor weatherability and ultraviolet light resistance.

Recently a polyester type powder coating composition has been rapidly investigated and various reports thereon have been published. However, use of IPG as an essential polyol component has not been reported, and reports merely have been that a polyol other than IPG can be used. For example, a vehicle for a powder coating comprising (a) 70 to 99% by weight of a polycondensate obtained from 40 to 55 mole % of aromatic dicarboxylic acids (e.g., TA or DMT), 15 to 50 mole % of hydrogenated bisphenols and 5 to 40 mole % of aliphatic diols (e.g., ethylene glycol, propylene glycol or butylene glycol) and (b) 1 to 30% by weight of an amino resin is described in Japanese Patent Publication No. 6615/73. However, this conventional polyester type powder coating is not sufficiently satisfactory from the standpoint of storage stability and with respect to various properties such as smoothness, gloss, adhesiveness, boiling water resistance, etc. of a film obtained therefrom (see Comparative Example 2 described hereinafter).

Generally, it is desired for a powder coating to have sufficient storage stability (or powder stability) that blocking (or caking) after the production thereof does not occur. To achieve the above purpose, the softening point of the base resin must be high. On the other hand, since the flow properties of a powder coating on coating or curing must be good, the softening point of the base resin should be low. Thus, opposing requirements must be satisfied. Further, it is desirable for the mixing with a pigment to be easy in preparing a powder coating and pulverizing and screening of the powder coating desirably, should also be easy. The flowability on curing of a powder coating thus prepared preferably should also be good, curing to form a film should also occur at a temperature which is, relatively, not so high and pinholes, blisters, etc. should do not occur. Thus, coating should have a good smoothness, gloss, flexibility, chemical resistance, stain resistance and water resistance.

SUMMARY OF THE INVENTION

Therefore, a primary object of the present invention is to provide a novel and useful powder coating composition.

Another object of the present invention is to provide a powder coating composition containing, as a vehicle, a polycondensate obtained from IPG and TA and/or DMT.

Still another object of the present invention is to provide a powder coating composition, specifically, having excellent storage stability.

A further object of the present invention is to provide a powder coating composition exhibiting excellent film properties such as boiling water resistance, smoothness, gloss and adhesiveness.

The above objects of the present invention will be apparent from the foregoing descriptions.

It has now been found that where a polycondensate obtained from IPG and TA or DMT is used as a vehicle for a powder coating, a powder coating composition having various excellent properties such as no occurrence of blocking during storing; excellent flowability on curing; excellent smoothness, good gloss, good flexibility, good adhesiveness, good stain resistance, good chemical resistance, good salt spray resistance and excellent boiling water resistance of the surface of the coating formed; etc. can be obtained. Since a powder coating composition having excellent flowability on curing can be obtained, one of the characteristics of the present invention is that a coating having a thin film thickness can be obtained. Thus, it is a surprising and novel discovery that the storage stability of the powder coating obtained and the various film properties such as boiling water resistance, smoothness, gloss, flexibility, adhesiveness or the like can be remarkably improved by using essentially IPG (2-methylbutane-1,3-diol;

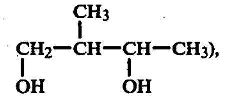

selected from aliphatic diols, as a polyol component for a polyester.

Accordingly, this invention provides a powder coating composition which comprises a vehicle comprising (a) about 50 to about 98% by weight of a polycondensate having a softening point of about 80° to 150° C. obtained from
 (i) a polyol component comprising at least about 30 mol% 2-methylbutane-1,3-diol and
 (ii) a polycarboxylic acid component comprising at least about 50 mol% terephthalic acid and/or dimethyl terephthalate, and
(b) about 2 to about 50% by weight of a crosslinking agent.

THE DETAILED DESCRIPTION OF THE INVENTION

The polycondensate used in the present invention can be obtained using a conventional polycondensation method employing the following starting materials. It is essential to use in the polycondensate IPG as a polyol component and TA and/or DMT as a polycarboxylic acid component, but other conventional diols, other triols or higher polyols and/or other polycarboxylic acids can be used in combination therewith in the polycondensation reaction.

In this case, the IPG content in the polyol component must be at least about 30 (mole/mole) %, preferably at least about 40 (mole/mole) % and the TA and/or DMT content in the polycarboxylic acid component must be at least about 50 (mole/mole) %, preferably at least about 55 (mole/mole) %. Where the IPG content is below about 30 (mole/mole) % or the TA and/or DMT content is below about 50 (mole/mole) %, the film properties, especially smoothness of the film surface, of the powder coating obtained deteriorate remarkably. As used herein the term (mole/mole) % for the IPG and for the TA and/or DMT content refers respectively to the ratio of moles of IPG to total moles of IPG and other polyol components and to the ratio of moles of TA and/or DMT to the total moles of TA and/or DMT with other polycarboxylic acid components, respectively, expressed in mole %.

Suitable examples of other diols which can be used in the diol component include diols having 2 to 20 carbon atoms such as ethylene glycol, propylene glycol, butylene glycols (-1,2; -1,3; and -2,3), 1,5-pentane diol, diethylene glycol, dipropylene glycol, triethylene glycol, hexane diols, nonane diols, decane diols, pentadecane diols, neopentyl glycol, cyclohexane diol, cyclohexane dimethanol, hydrogenated bisphenols or the like and suitable examples of triols or higher polyols which can be used include triols having 3 to 15 carbon atoms such as glycerin, trimethylolethane, trimethylolpropane, 1,2,6-hexane triol, or the like, and higher polyols having 4, 5, or 6 hydroxy groups and containing 3 to 15 carbon atoms such as erythritol, pentaerythritol, dipentaerythritol or the like.

Examples of polycarboxylic acids other than TA or DMT which can be used in the polycarboxylic acid component include aromatic polycarboxylic acids having 8 to 12 carbon atoms and 2 to 4 carboxyl groups such as isophthalic acid, dimethyl isophthalate, phthalic anhydride, trimellitic acid, pyromellitic acid or the anhydride thereof or the like; aliphatic polycarboxylic acids having 4 to 12 carbon atoms and 2 or 3 carboxyl groups such as succinic acid, adipic acid, sebacic acid, 1,10-decane dicarboxylic acid, azelaic acid or the like; or the like.

The polycondensation reaction proceeds easily in the presence or absence of a catalyst. Catalysts suitable for the polycondensation reaction include known esterification or transesterification catalysts, e.g., metal oxides such as zinc oxide, lead oxide, antimony oxide or titanium oxide, organic or inorganic metal salts such as zinc acetate, calcium acetate, cobalt acetate, manganese acetate, lead acetate, stannous oxalate, zinc naphthenate, zirconium naphthenate, aluminum sulfate or lead nitrate, organic metal compounds such as dibutyl tin oxide, tetrabutyl zirconate, tetrabutyl titanate, tetrabutoxy titanate, or tributyl antimony, metal halides such as zinc chloride, titanium tetrafluoride, or aluminum chloride, acids such as sulfuric acid, phosphoric acid or p-toluene sulfonic acid, and ion exchange resins.

Further, in order to prevent side-reactions such as ether formation, weak alkaline materials such as alkali metal salts (e.g., lithium acetate, potassium acetate, sodium acetate, etc.), alkaline earth metal salts (e.g., calcium acetate, calcium naphthenate, etc.), amines (e.g., triethylamine, trimethyl amine, etc.) or the like can be added.

These catalysts can be used either individually or as a combination thereof. The catalyst is usually used in an amount of about 0.001 to about 1% by weight, preferably about 0.01 to about 0.5% by weight, based on the weight of the polycarboxylic acid component.

Usually, the polycondensation is carried out at a temperature of about 100° to about 250° C. under reduced pressure, atmospheric pressure or super atmospheric pressure, preferably at atmospheric pressure, for about 2 to about 20 hours in an inert atmosphere, preferably by bubbling an inert gas such as carbon dioxide or nitrogen through the esterification mixture. During the course of the reaction, water (methanol in the case of using DMT) is formed and reduces the rate of reaction. It is desirable, therefore, to remove the water (or methanol) produced from the reaction system as soon as possible, e.g., by bubbling an inert gas through the esterification mixture, etc. Near the end of the polycondensation reaction, the esterification mixture is generally subjected to a reduced pressure treatment. The reduced pressure treatment is usually carried out at a temperature of about 150° to about 230° C. under a pressure of about 1 to about 50 mmHg abs. for about 1 min. to about 20 hrs. and provides the advantages of distilling off unreacted polyols, increasing the molecular weight of the polycondensate obtained and elevating the softening point of the polycondensate.

The completion of the polycondensation reaction is based on the softening point of the polycondensate (or polyester). The reaction is completed when the softening point of the polycondensate reaches a desired point within about 80° to about 150° C. Where the softening point of the polycondensate is below about 80° C., the storage stability deteriorates and, on the other hand, where the softening point is higher than about 150° C., film properties such as smoothness of the film surface, Ericksen depression, etc., are not good and it is not suitable as a vehicle for a powder coating.

The polycondensate thus obtained is a polyester wherein at least about 30 mole % of the polyol component is an IPG repeating (structural) unit and at least about 50 mole % of the polycarboxylic acid component is a terephthalic acid repeating unit.

Any crosslinking agent which is a compound capable of carrying out a crosslinking reaction with the polycondensate can be added to the polycondensate. Preferred crosslinking agents are amino resins and blocked polyisocyanates. For example, amino resins are methylolated amino compounds such as methylolated melamine (e.g., hexamethylol melamine, etc.), methylolated urea, methylolated benzoguanamine or the like obtained by a condensation of amino compounds (such as melamine, urea, benzoguanamine or the like) and formaldehyde, or alkoxides (such as tetrabutoxymethylbenzoguanamine, hexamethoxymethylmelamine or the like) of these methylolated compounds and aliphatic alcohols (such as methanol, ethanol, propanols, butanols or the like having 4 or less carbon atoms). These materials are generally the so-called melamine-formaldehyde resins, urea-formaldehyde resins, benzoguanamine-formaldehyde resins or the like. Further, as blocked polyisocyanates, polyisocyanate compounds obtained from phenols, caprolactams, aliphatic alcohols or the like and the tolylene diisocyanate, isophorone diisocyanate, hexamethylene diisocyanate or the like and condensation products of diisocyanates and trimethylol propane condensate can be used.

The amount of each of the polycondensate and the crosslinking agent blended in the present invention is important and the amount is such that a coating having excellent properties can be obtained and storage stability as a powder coating can be maintained. More precisely, the amount of the polycondensate employed is about 50 to about 98% by weight, preferably about 60 to about 96% by weight, and the amount of the crosslinking agent employed is about 2 to about 50% by weight, preferably about 4 to about 40% by weight. A powder coating composition using a vehicle comprising such a polycondensate and a crosslinking agent can also contain conventional additives such as a pigment, a flow agent, a cure accelerator or the like and such can be mixed uniformly at a temperature not lower than the softening point of the vehicle, preferably not lower than the melting point of the vehicle. After cooling to room temperature (about 20°-30° C.), the resulting mixture is pulverized with a pulverizer to obtain a coating composition in a powder form. Generally, where the additives are added to the vehicle, the additives may be added to the vehicle in a molten state and kneaded, or, after blending the additives with the vehicle as a solid, the resulting blend may be heat melted and kneaded.

Generally known inorganic or organic pigments can be used as a pigment, and examples thereof include powders of titanium dioxide (titanium white), zinc oxide, carbon black, ferric oxide, aluminum, phthalocyanine blue, phthalocyanine green, or the like. The amount of the pigments used will vary greatly depending upon the kind of pigment, the size of the pigment particles or the size distribution thereof. However, the amount of the pigment is generally up to about 200 parts, preferably up to 100 parts, by weight based on 100 parts by weight of the vehicle.

A flow agent is used to improve the flowability of the powder coating on heating and curing the powder coating to form a coating, and examples thereof include "Modaflow" (trade name, a product of Monsanto Co.), "L-5310" (trade name, a product of Union Carbide Co.) or the like which are commercially available. The amount thereof is up to about 3 parts, preferably up to 1.5 parts, by weight based on 100 parts by weight of the vehicle.

A cure accelerator is used to promote the curing reaction on heating the powder coating to form a cured coating, and examples thereof include conventional cure accelerators such as tertiary amines (e.g., triethanolamine, dimethylaminoethyl methacrylate or pyridine, etc.), organic tin compounds (e.g., dibutyl tin oxide, dibutyl tin dilaurate, dibutyl tin dichloride, etc.) or the like. The amount thereof is up to about 10 parts by weight based on 100 parts by weight of the vehicle.

The vehicle to which the above described additives are uniformly blended is, after cooling, pulverized using conventional techniques to obtain a coating composition in a powder form. In this case, the size of the particles of the powder coating is generally about 100 microns or less, preferably 75 microns or less. The minimum size of the particles is generally about 10 microns. Where the particles have a size above about 100 microns, a coating having a smooth surface cannot be obtained.

The present invention is illustrated in greater detail by reference to the following Examples. However, the present invention is not to be construed as being limited to these Examples only. Unless otherwise indicated, all parts, percents, weights, ratios and the like are "by weight".

EXAMPLE 1

Into a 3-liter inner volume glass reactor equipped with an agitator, a thermometer, a condenser and inert gas inlet and outlet tubes were charged 9.05 moles of IPG, 2.25 moles of trimethylol propane, 10 moles of TA and 4 g of dibutyl tin oxide and the mixture was stirred at 150° to 230° C. at atmospheric pressure for 4.5 hours. After distilling off the theoretical amount of water produced, the contents in the reactor were cooled to 210° C. and the polycondensation was completed at a pressure of 15 mmHg abs. for 1.5 hours. The number average molecular weight of the polycondensate obtained was 3,400, the acid value thereof was 5.0 and the softening point thereof was 110° C.

10 parts of hexamethoxymethylmelamine, 45 parts of titanium dioxide and 0.5 part of "Modaflow" (as defined before) were added to 100 parts of the polycondensate and the mixture was melt kneaded at 140° C. for 20 min. with heated rollers. After cooling to room temperature (about 20°-30° C.), the resulting blend was pulverized and sieved to obtain powders having an average particle diameter of 45 microns.

The powders were coated on a mild steel sheet (0.8 mm×50 mm×150 mm) using an electrostatic spray-coating method and cured at 200° C. for 30 min. to obtain a cured film having a thickness of about 60 microns. The properties of the powders and the film obtained are shown in the Table below.

EXAMPLE 2

In the same type of glass reactor as was used in Example 1 were charged 8.8 moles of IPG, 2.5 moles of trimethylol propane, 8.0 moles of TA and 3 g of tetrabutoxy titanate and the mixture was stirred at 150° to 230° C. under atmospheric pressure for 5 hours. After distilling off a theoretical amount of water produced, 2.0 moles of isophthalic acid were added thereto and the mixture was stirred at 150° to 230° C. at atmospheric pressure for 2 hours. The temperature in the reactor was reduced to 210° C. and the polycondensation reaction was completed at a pressure of 15 mmHg abs. for 1 hour. The number average molecular weight of the polycondensate was 3,200, the acid value thereof was 4.6 and the softening point thereof was 104° C.

90 Parts of the polycondensate together with 10 parts of tetrabutoxymethylbenzoguanamine, 45 parts of titanium dioxide and 0.5 part of "Modaflow" (as defined before) were melt kneaded at 140° C. for 20 min. with heated rollers. After cooling, the resulting blend was pulverized and sieved to obtain powders having an average particle diameter of 40 microns.

The powders were coated in the same manner as in Example 1.

The properties of the powders and the film obtained are shown in the Table below.

EXAMPLE 3

Into the same type of glass reactor as was used in Example 1 were charged 10.4 moles of IPG, 1.0 mole of trimethylol ethane, 9.0 moles of TA, and 3 g of tetrabutoxy titanate and the mixture was stirred at 150° to 230° C. at atmospheric pressure for 5 hours to distill off the theoretical amount of water produced. After reducing the temperature of the contents in the reactor to 140° C., 1 mole of adipic acid was added thereto and the mixture was stirred at 150° to 190° C. at atmospheric pressure for 2 hours and the polycondensation reaction was completed at a pressure of 15 mmHg abs. for 30 minutes. The number average molecular weight of the polycondensate was 3,100, the acid value thereof was 7.5 and the softening point thereof was 95° C.

75 Parts of the polycondensate, 25 parts of ε-caprolactam-blocked isophorone diisocyanate, 45 parts of titanium dioxide and 0.5 part of "Modaflow" (as defined before) were melt kneaded with an extruder. After cooling, the resulting blend was pulverized and sieved to obtain powders having an average particle diameter of 45 microns.

The powders obtained were coated in the same manner as in Example 1 to obtain a film.

The properties of the powders and the film obtained are shown in the Table below.

EXAMPLE 4

Into the same type of glass reactor as was used in Example 1 were charged 9.5 moles of IPG, 1 mole of trimethylol propane, 10 moles of DMT and 5 g of zinc acetate and the mixture was stirred at 150° to 230° C. at atmospheric pressure for 9 hours to distill off the methanol formed. The polycondensation reaction was completed at a pressure of 15 mmHg abs. for 2 hours. The number average molecular weight of the polycondensate obtained was 3,700, the acid value thereof was 7.7 and the softening point thereof was 110° C.

92 Parts of the polycondensate, 8 parts of hexamethoxymethylmelamine, 45 parts of titanium dioxide, 0.5 part of "Modaflow" (as defined before) and 0.5 part of phthalic anhydride were melt kneaded at 140° C. for 20 min. with heated rollers. After cooling, the resulting blend was pulverized and sieved to obtain powders having an average particle diameter of 45 microns.

The powders obtained were coated in the same manner as in Example 1 to obtain a film.

The properties of the powders and the film obtained are shown in the Table below.

EXAMPLE 5

Into the same type of glass reactor as was used in Example 1 were charged 6.0 moles of IPG, 2.5 moles of 1,3-butane diol, 2.0 moles of trimethylol propane, 10 moles of DMT and 3 g of tetrabutoxy titanate and the mixture was stirred at 150° to 210° C. at atmospheric pressure for 9 hours to distill off the methanol formed followed by completion of the polycondensation reaction at a pressure of 15 mmHg abs. for 1 hour. The number average molecular weight of the polycondensate obtained was 3,000, the acid value thereof was 4.5 and the softening point thereof was 99° C.

65 Parts of the polycondensate obtained above, 45 parts of ε-caprolactam-blocked isophorone diisocyanate, 45 parts of titanium dioxide and 0.5 part of "Modaflow" (as defined before) were melt kneaded. After cooling, the resulting blend was pulverized and sieved to obtain powders having an average particle diameter of 45 microns.

The powders obtained were coated in the same manner as in Example 1 to obtain a film.

The properties of the powders and the film obtained are shown in the Table below.

EXAMPLE 6

58 Parts of the polycondensate obtained in Example 1, 52 parts of ε-caprolactam-blocked isophorone diisocyanate, 45 parts of titanium dioxide and 0.5 part of "Modaflow" (as defined before) were melt kneaded. After cooling, the resulting blend was pulverized and sieved to obtain powders having an average particle diameter of 45 microns.

The powders obtained were coated in the same manner as in Example 1 to obtain a film.

The properties of the powders and the film obtained are shown in the Table below.

EXAMPLE 7

Into the same type of glass reactor as was used in Example 1 were charged 11.5 moles of IPG, 10.0 moles of TA and 4 g of dibutyl tin oxide and the mixture was stirred at 150° to 230° C. at atmospheric pressure for 8 hours followed by a completion of the polycondensation reaction at a pressure of 15 mmHg abs. for 2 hours. The number average molecular weight of the polycondensate obtained was 3,500, the acid value thereof was 6.8 and the softening point thereof was 102° C.

70 Parts of the polycondensate obtained above, 30 parts of hexamethoxymethylmelamine, 55 parts of titanium dioxide and 0.5 part of "L-5310" (as defined before) were melt kneaded. After cooling, the resulting blend was pulverized and sieved to obtain powders having an average particle diameter of 45 microns.

The powders obtained were coated in the same manner as in Example 1 to obtain a film.

The properties of the powders and the film obtained are shown in the Table below.

EXAMPLE 8

Into the same type of glass reactor as was used in Example 1 were charged 4.0 moles of IPG, 1.2 moles of trimethylol propane, 6.0 moles of hydrogenated bisphenol A, 10 moles of TA and 4 g of tetrabutoxy titanate and the mixture was stirred at 150° to 230° C. at atmospheric pressure for 8 hours followed by a completion of the polycondensation reaction at a pressure of 15 mmHg abs. for 1 hour. The number average molecular weight of the polycondensate obtained was 3,000, the acid value thereof was 8.5 and the softening point thereof was 102° C.

60 Parts of the polycondensate obtained above, 40 parts of hexamethoxymethylmelamine, 55 parts of titanium dioxide and 0.5 part of "Modaflow" (as defined before) were melt kneaded. After cooling, the resulting blend was pulverized and sieved to obtain powders having an average particle diameter of 45 microns.

The powders obtained were coated in the same manner as in Example 1 to obtain a film.

The properties of the powders and the film obtained are shown in the Table below.

EXAMPLE 9

Into the same type of glass reactor as was used in Example 1 were charged 8.0 moles of IPG, 1.0 mole of propylene glycol, 1.0 mole of pentaerythritol, 9.5 moles of TA and 3 g of dibutyl tin oxide and the mixture was stirred at 150° to 230° C. at atmospheric pressure for 8 hours followed by a completion of the polycondensation reaction at a pressure of 15 mmHg abs. for 1 hour. The number average molecular weight of the polycondensate obtained was 3,200, the acid value thereof was 6.4 and the softening point thereof was 105° C.

75 Parts of the polycondensate, 25 parts of hexamethoxymethylmelamine, 45 parts of titanium dioxide and 0.5 part of "Modaflow" (as defined before) were melt kneaded. After cooling, the resulting blend was pulverized and sieved to obtain powders having an average particle diameter of 45 microns.

The powders obtained above were coated in the same manner as in Example 1 to obtain a film.

The properties of the powders and the film obtained are shown in the Table below.

EXAMPLE 10

Into the same type of glass reactor as was used in Example 1 were charged 10.4 of IPG, 1.0 mole of pentaerithritol, 6.0 moles of TA, 4.0 moles of isophthalic acid and 3 g of tetrabutyl titanate and the mixture was stirred at 150° to 230° C. at atmospheric pressure for 9 hours followed by a completion of the polycondensation reaction at a pressure of 15 mmHg abs. for 1 hour. The number average molecular weight of the polycondensate obtained was 3,200, the acid value thereof was 5.7 and the softening point thereof was 96° C.

75 Parts of the polycondensate, 25 parts of hexamethoxymethylmelamine, 55 parts of titanium dioxide and 0.5 part of "Modaflow" (as defined before) were melt kneaded. After cooling, the resulting blend was pulverized and sieved to obtain powders having an average particle diameter of 45 microns.

The powders obtained above were coated in the same manner as in Example 1 to obtain a film.

The properties of the powders and the film obtained are shown in the Table below.

COMPARATIVE EXAMPLE 1

Into the same type of glass reactor as was used in Example 1 were charged 8.8 moles of neopentyl glycol, 2.23 moles of trimethylol propane, 8.0 moles of TA and 3 g of dibutyl tin oxide and the mixture was stirred at 150° to 230° C. at atmospheric pressure for 5 hours. The temperature in the reactor was decreased to 210° C. and the polycondensation reaction was completed at a pressure of 15 mmHg abs. for 2 hours. The number average molecular weight of the polycondensate obtained was 3,400, the acid value thereof was 8.7 and the softening point thereof was 111° C.

90 Parts of the polycondensate obtained above, 10 parts of hexamethoxymethylmelamine, 45 parts of titanium dioxide and 0.3 part of "Modaflow" (as defined before) were melt kneaded at 140° C. for 20 min with heated rollers. After cooling, the resulting blend was pulverized and sieved to obtain powders having an average particle diameter of 45 microns.

The powders obtained were coated in the same manner as in Example 1 to obtain a film.

The properties of the powders and the film obtained are shown in the Table below.

As is apparent from the results in the Table below, where IPG is not used as a polyol component, the storage stability of a powder coating obtained specifically is poor and various properties of gloss, appearance, flexibility and cross hatch adhesion after testing of resistance to boiling water of the film are also inferior.

COMPARATIVE EXAMPLE 2

Into the same type of glass reactor as was used in Example 1 were charged 6.1 moles of hydrogenated bisphenol A, 4.3 moles of 1,3-butylene glycol and 9.6 moles of TA and the mixture was stirred at 180° C. for 6 hours and 220° C. for 10 hours and then 240° C. for 8 hours at atmospheric pressure.

The number average molecular weight of the polycondensate obtained was 3,500, the acid value thereof was 7.3 and the softening point thereof was 100° C.

95 Parts of the polycondensate obtained above, 5 parts of hexamethoxymethylmelamine, 45 parts of titanium dioxide and 0.5 part of "Modaflow" (as defined before) were melt kneaded. After cooling, the resulting blend was pulverized and sieved to obtain powders having an average particle diameter of 45 microns.

The powders obtained were coated in the same manner as in Example 1 to obtain a film.

The properties of the powders and the film obtained are shown in the Table below.

As is apparent from the results in the Table, where IPG is not used as a polyol component, various properties of storage stability of the powder coating at 40° C., gloss, appearance and cross hatch adhesion after testing for resistance to boiling water of the film are inferior specifically.

COMPARATIVE EXAMPLE 3

35 Parts of the polycondensate obtained in Example 5, 65 parts of ε-caprolactam-blocked isophorone diisocyanate, 45 parts of titanium dioxide and 0.5 part of "Modaflow" (as defined before) were melt kneaded. After cooling, the resulting blend was pulverized and sieved to obtain powders having an average particle diameter of 45 microns.

The powders obtained were coated in the same manner as in Example 1 to obtain a film.

The properties of the powder and the film obtained are shown in the Table below.

As is apparent from the results in the Table below where the polycondensate content in the vehicle is below 50 mole %, various properties of gloss, appearance, flexibility, impact resistance and cross hatch adhesion after testing for resistance to boiling water of the coating deteriorated specifically.

Table

| | Example No. | | | |
|---|---|---|---|---|
| Property of Powders: | 1 | 2 | 3 | 4 |
| Storage stability *1 | | | | |
| (a) | No blocking | No blocking | No blocking | No blocking |
| (b) | No blocking | No blocking | No blocking | No blocking |
| Properties of Film: | | | | |
| Film Thickness *2 (μ) | about 60 | about 40 | about 25 | about 60 |
| Gloss *3 | 96 | 97 | 98 | 96 |
| Appearance of Film Surface *4 | No orange peel | No orange peel | No orange peel | No orange peel |
| Cross Hatch Adhesion *5 | 100/100 | 100/100 | 100/100 | 100/100 |
| Flexibility (conical mandrel) *6 (mm) | φ4 | φ4 | φ4 | φ4 |

Table-continued

| | | | | |
|---|---|---|---|---|
| Impact Resistance *7 (cm) | 50 | 50 | 50 | 50 |
| Erichsen Depression *8 (mm) | 9 | 8 | 10 | 9 |
| Salt Spray Test *9 | Pass | Pass | Pass | Pass |
| Boiling Water Test *10 | No change | No change | No change | No change |
| Cross Hatch Adhesion after Boiling Water Test | 100/100 | 100/100 | 100/100 | 80/100 |

| Example No. | | | | | |
|---|---|---|---|---|---|
| 5 | 6 | 7 | 8 | 9 | 10 |
| No blocking | No blocking | No blocking | No blocking | No blocking | No blocking |
| about 60 | about 60 | about 70 | about 70 | about 60 | about 60 |
| 94 | 94 | 96 | 95 | 95 | 97 |
| No orange peel | No orange peel | No orange peel | No orange peel | No orange peel | No orange peel |
| 100/100 | 100/100 | 100/100 | 100/100 | 100/100 | 100/100 |
| $\phi 6$ | $\phi 6$ | $\phi 4$ | $\phi 6$ | $\phi 6$ | $\phi 4$ |
| 50 | 50 | 50 | 40 | 40 | 50 |
| 6 | 8 | 8 | 6 | 6 | 8 |
| Pass | Pass | Pass | Pass | Pass | Pass |
| No change | No change | No change | No change | No change | No change |
| 80/100 | 90/100 | 100/100 | 100/100 | 80/100 | 100/100 |

| Comparative Example No. | | |
|---|---|---|
| 1 | 2 | 3 |
| Trace of blocking | No blocking | No blocking |
| Trace of blocking | Trace of blocking | No blocking |
| about 60 | about 70 | about 60 |
| 85 | 87 | 84 |
| Orange peel | Orange peel | Orange peel |
| 100/100 | 100/100 | 100/100 |
| $\phi 8$ | $\phi 6$ | $\phi 10$ |
| 40 | 40 | 20 |
| 6 | 7 | 2 |
| Pass | Pass | Pass |
| No change | No change | No change |
| 60/100 | 60/100 | 60/100 |

Notes

*1 : About 20g of powder was charged into a glass vessel and allowed to stand under the conditions below to observe blocking or caking of the powder. (a) : 35° C. × 1 week (b) : 40° C. × 1 week

*2 : Cure conditions 180°-200° C. × 30 min.)

*3 : Gloss 60° spectral value according to ASTM Method D-523

*4 : The surface of the film coated on the mild steel sheet was visually observed as to whether the surface was flat.

*5 : Cross Hatch Adhesion Test according to ASTM Paint Test Manual, Edition 13, page 319 (1972) (Cross Section : 1mm × 1mm × 100)

*6 : According to ASTM Method D-522

*7 : Du Pont Typing Machine (½ inch × 500 g)

*8 : Using Erichsen film tester, a hemispherical ball having a diameter of 20mm was gradually pressed against the film surface and the depression (depth) of the hemispherical ball when the film broke was measured.

*9 : An aqueous NaCl solution of a concentration of about 5% was continuously sprayed on the film surface at room temperature (about 20-25° C.) for 500 hrs. and the change of the film surface was observed. The expression "pass" means that no change was observed on the surface.

*10 : A mild steel sheet having the film coated thereon was immersed in a boiling water (100° C.) for 2 hrs. and the change of the film surface was observed.

While the invention has been described in detail and with reference to specific embodiments thereof, it will be apparent to one skilled in the art that various changes and modifications can be made therein without departing from the spirit and scope thereof.

What is claimed is:

1. A powder coating composition which contains a vehicle comprising (a) about 50 to about 98% by weight of a polycondensate having a softening point of about 80° to about 150° C. obtained from (i) a polyol component comprising at least about 30 mole % of 2-methylbutane-1,3-diol, and (ii) a polycarboxylic acid component comprising at least about 50 mole % of terephthalic acid and/or dimethyl terephthalate, and (b) about 2 to about 50% by weight of a crosslinking agent selected from the group consisting of an amino resin, a blocked polyisocyanate or mixtures thereof.

2. The powder coating composition as claimed in claim 1, wherein the amount of said polycondensate is about 60 to about 96% by weight and the amount of said crosslinking agent is about 4 to about 40% by weight.

3. The powder coating composition as claimed in claim 1, wherein said polyol component is 2-methylbutane-1,3-diol, and said polycarboxylic acid component is terephthalic acid and/or dimethyl terephthalate.

4. The powder coating composition as claimed in claim 3, wherein the molar ratio of the 2-methylbutane-1,3-diol to the terephthalic acid and/or dimethyl terephthalate in the polycondensate is 0.8:1.0 to 1.5:1.0.

5. The powder coating composition as claimed in claim 4, wherein said molar ratio is 0.9:1.0 to 1.2:1.0.

6. The powder coating composition as claimed in claim 1, wherein said polycondensate has a molecular weight ranging from about 1,000 to about 10,000.

7. The powder coating composition as claimed in claim 1, wherein said polycondensate has an acid value of about 200 (mg.KOH/g) or less.

8. The powder coating composition as claimed in claim 1, wherein said crosslinking agent is an amino resin.

9. The powder coating composition as claimed in claim 8, wherein said amino resin is selected from the group consisting of a melamine-formaldehyde resin, a urea-formaldehyde resin, a benzoguanamine-formaldehyde resin and mixtures thereof.

10. The powder coating composition as claimed in claim 1, wherein said composition further contains a pigment.

11. The powder coating composition as claimed in claim 10, wherein the amount of said pigment ranges up to about 100 parts by weight based on 100 parts by weight of the vehicle.

12. The powder coating composition as claimed in claim 10, wherein a size of the particles of the powder coating composition is about 100 microns or less.

13. The powder coating composition as claimed in claim 1, wherein said composition further contains a flow agent.

14. The powder coating composition as claimed in claim 13, wherein the amount of said flow agent is about 1 part by weight or less based on 100 parts by weight of the vehicle.

15. The powder coating composition as claimed in claim 13, wherein the size of the particles of the powder coating composition is about 100 microns or less.

16. The powder coating composition as claimed in claim 13, wherein said composition further contains a cure accelerator.

17. The powder coating composition as claimed in claim 16, wherein the amount of said cure accelerator is about 10 parts by weight or less based on 100 parts by weight of the vehicle.

18. The powder coating composition as claimed in claim 16, wherein the size of the particles of the powder coating composition is about 100 microns or less.

19. The powder coating composition as claimed in claim 8, wherein said amino resin is a condensation product of an amino compound and formaldehyde or an alkoxide of a condensation product of an amino compound and formaldehyde.

20. The powder coating composition as claimed in claim 19, wherein said amino compound is selected from the group consisting of melamine, urea or benzoguanamine.

21. The powder coating composition as claimed in claim 19, wherein said alkoxide is a product of an aliphatic alcohol having 4 or less carbon atoms and said condensation product of an amine compound and formaldehyde.

22. The powder coating composition as claimed in claim 21, wherein said alkoxide is hexamethoxymethylmelamine.

23. The powder coating composition as claimed in claim 1, wherein said crosslinking agent is a blocked polyisocyanate.

24. The powder coating composition as claimed in claim 23, wherein said blocked polyisocyanate is obtained from a phenol, a caprolactam or an aliphatic alcohol and tolylene diisocyanate, isophorone diisocyanate or hexamethylene diisocyanate; or obtained from the condensation of a diisocyanate and trimethylol propane.

* * * * *